United States Patent
Zeng et al.

(10) Patent No.: US 8,976,481 B1
(45) Date of Patent: Mar. 10, 2015

(54) TOUCH DOWN DETECTION WITH HDI SENSOR DC MODE

(71) Applicants: SAE Magnetics (H.K.) Ltd., Shatin, N.T. (HK); Headway Technologies, Inc., Milpitas, CA (US)

(72) Inventors: Qinghua Zeng, Fremont, CA (US); Ellis Cha, San Ramon, CA (US); Soramany Ka, San Jose, CA (US)

(73) Assignees: SAE Magnetics (HK) Ltd., Shatin, N.T., Hong Kong; Headway Technologies, Inc., Milpitas, CA (US)

( * ) Notice: Subject to any disclaimer, the term of this patent is extended or adjusted under 35 U.S.C. 154(b) by 0 days.

(21) Appl. No.: 14/182,377

(22) Filed: Feb. 18, 2014

(51) Int. Cl.
  *G11B 21/02* (2006.01)
  *G11B 5/09* (2006.01)

(52) U.S. Cl.
  USPC .................................. 360/75; 360/48; 360/55

(58) Field of Classification Search
  USPC ........ 360/55, 48, 135, 39, 75, 31, 69, 125.31, 360/125.74
  See application file for complete search history.

(56) References Cited

U.S. PATENT DOCUMENTS

| | | | |
|---|---|---|---|
| 7,616,398 B2 | 11/2009 | Gong et al. | |
| 8,203,802 B2 | 6/2012 | Ehrlich et al. | |
| 8,599,506 B2 | 12/2013 | Contreras et al. | |
| 8,625,214 B2 | 1/2014 | Takeuchi et al. | |
| 8,717,702 B2 * | 5/2014 | Zeng et al. | 360/75 |
| 2013/0170070 A1 | 7/2013 | Das et al. | |
| 2013/0250446 A1 | 9/2013 | Zeng et al. | |
| 2013/0250455 A1 | 9/2013 | Zeng at al. | |
| 2013/0279039 A1 * | 10/2013 | Shiroishi | 360/48 |

* cited by examiner

*Primary Examiner* — Ali Neyzari
(74) *Attorney, Agent, or Firm* — Saile Ackerman LLC; Stephen B. Ackerman

(57) ABSTRACT

Methods are provided for determining the heater power level of a dynamic flying height (DFH) type write head at which a touch down (TD) occurs. Each method makes use of the DC component of a head-disk interference (HDI) sensor and the determination of the TD heater energy is deduced from certain characteristics of the function relating heater power to HDI DC signal strength. Characteristics that provide reliable indication of a TD include points of minimum slope, structure of the slope's slope and the properties of a linear fit to the slope if the slope does not converge to a consistent value. It is found that the use of all methods in combination allow a reliable TD determination under virtually all conditions.

17 Claims, 4 Drawing Sheets

TOUCH DOWN DETECTION WITH HDI SENSOR DC MODE

TOUCH DOWN DETECTION WITH HDI SENSOR DC MODE

1. Technical Field

This disclosure relates to the fabrication of hard disk drives (HDD), particularly to a method of determining the heater power level of a dynamic flying height (DFH) type write head at which a touch down (TD) occurs.

2. Background

As magnetic read/write heads have been required to deal with magnetic media having increasingly higher area density of recorded information, various methods have been developed to improve the capabilities of the head to read and write at those levels. Traditionally, the direction taken in trying to achieve the reading and writing of this high density information has been to decrease the spacing (i.e. the static fly height) between the disk and the slider in each new generation of products.

FIG. 1 is a schematic illustration showing a single suspension-mounted slider (the combination collectively termed a "head gimbals assembly (HGA)") positioned above a spindle-mounted, rapidly rotating magnetic hard disk during disk-drive operation in a hard disk drive, HDD, (or a spinstand) at ambient operating temperature. A flexible gimbals suspension (101) holds the slider (10) at an angle above the surface of the spindle-mounted magnetic disk (400), producing a "fly height" (clearance) between the air bearing surface (ABS) (100) of the slider and the disk. A read/write head (600) is mounted within the slider. The rotation of the disk (400) is, by definition, into the leading edge of the slider, while the read/write head (600) is located at the trailing edge of the slider. The write-gap (30) (across which the write magnetic field emerges) of the head (90) is "above" (i.e. to the trailing edge side of) the read-gap portion (30). The hydrodynamics of the air layer between the ABS and the rotating disk surface supports the slider at its fly height above the disk.

In a dynamic flying height (DFH) type of system that is considered herein, one or more controllable heater elements (35), is located adjacent to the write gap (30). By applying power to the heater element and heating the region surrounding the gap, thermal expansions cause protrusions (not shown) of the ABS (200) of the head portion relative to the undisturbed shape of the ABS when it is not heated. These protrusions will produce a characteristic shape (the protrusion profile) across the ABS, which will manifest itself in reduction of the flying height of the ABS above the disk, which is the dynamic flying height effect referred to. It is to be noted that modern HDD systems contain multiple disks and multiple read/write heads that are aligned with each of the multiple disks. Therefore, the method to be discussed herein may be discussed in terms of a single disk and its head, but the method is in no way limited to a single head/disk combination and it may, by extension, be applied to a multiplicity of disks and their associated heads. Similarly, the steps required to implement the method as discussed herein are easily implemented in a single head/disk combination or, independently, in a multiple head/disk combination. Finally, all steps required to implement the method can be implemented in hardware or firmware incorporated within the HDD, the spin stand or the multiple disk HDD.

Consistent and rapid increase in the recording area density of hard disk drives requires a corresponding continuous decrease in the flying height of the slider or mechanical spacing between magnetic recording head and disk. After the FH was reduced to about 10 nm, further decrease in FH became extremely difficult. Now that the thermal expansion based technique of DFH has emerged, dynamic control of the flying height during disk rotation has become possible (as discussed above). This technology has been widely applied in the past several years. As the recording density approaches 150 Gbit/cm2 (1 Tbit/in2), the spacing must now be decreased to below 1 nm.

In order to reliably control the spacing through activation of the heater, it is necessary to have a feasible way of measuring the spacing while applying power to the heater. Relative spacing change can be calculated based on the well-known Wallace equation that relates signal loss to spacing as a function of frequency. However, to determine the actual spacing, a reference point is needed. The reference point is usually taken as the point where the head touches the disk, called the touch down or TD point. It is defined as the zero of the spacing. The process of finding this reference point is correspondingly called TD detection. For better TD detection and potentially real time monitoring of head/disk spacing, the head element typically also includes a head-disk interference (HDI) sensor (or multiple HDIs). This sensor is typically a resistive temperature sensor used to detect a temperature change in the head that is induced by changes in clearance during head vibrations or by a direct contact caused by contacting disk asperities.

The HDI's signal (from whatever type sensor being utilized) has DC (low frequency) and AC (high frequency) components. When the slider flies at a low clearance and even contacts the disk, a strong high frequency (AC component) from the HDI might appear if the TD vibration is strong. In that case, the AC component can be used to detect the TD. However, if the TD vibration is weak, the AC signal might also be weak and too weak to produce a good detection of the TD. The AC signal might also be unreliable in the validity of its detections. It is the object of the present disclosure to devise a method for using the signal of a HDI sensor to obtain a reliable and accurate indication of a TD.

Although a search of the relevant prior art has discovered several teachings that attempt to address the issue of touch down detection, none of them apply the method to be described herein. For example: U.S. Pat. No. 8,203,802 (Ehrlich et al) describes touchdown detection based on rate of change (slope) of a position error signal variation. U.S. patent applications Ser. Nos. 2013/0250455 and 2013/0250446 (both Zeng et al) discuss touchdown detection using an HDI sensor where the AC component is said to be the more sensitive. We would comment in this regard that AC mode methods are good when there is adequate TD vibration, but they do not work well when the vibration is too weak. In that event, we still need a method that will provide effective detection. Furthermore, we need a method that is more robust than using the AC signal and is less prone to providing faulty detection.

U.S. Pat. No. 8,625,214 (Takeuchi et al) discloses touchdown detection using a root mean square method. U.S. Pat. No. 7,616,398 (Gong et al) describes fly height prediction based on change in the slope of the deviation fly height curve. U.S. Pat. No. 8,599,506 (Contreras et al) teaches determining fly height by injecting a modulating signal. U.S. patent application Ser. No. 2013/0170070 (Das et al) teaches touchdown detection using a temperature sensor.

Again, we would argue that none of these methods provide the same accurate and reliable results of the method to be discussed herein.

SUMMARY

A first object of the present disclosure is to provide an, accurate, reliable and cost-effective method of determining touch down (TD) incidents between a DFH type read/write head and a rotating disk surface in either a hard disk drive or a test spin-stand.

A second object of the present disclosure is to determine these TD incidents using the DC signal generated by a head-mounted HDI sensor as the head approaches TD conditions.

A third object of the present disclosure is to improve the overall accuracy of the method by combining results from three different approaches, each selected for its applicability to a particular design of a hard disk drive (HDD).

The objects of this disclosure will be achieved by use of the heat producing functions of a DFH-type slider mounted read/write head to provide systematic (typically stepwise) increases in heating power to the elements. As a result of the application of increasing heating power, the slider will approach the surface of the rotating disk and, as it does so, a corresponding DC signal will be generated by the HDI sensor. The functional relationship between the applied heating power and the HDI sensor DC response forms a curve (as illustrated graphically in FIG. 2a and FIG. 2b) indicating a correspondence between the applied heating power and the clearance variations between the head (slider ABS) and disk surface during disk rotations. The object of the present disclosure is to provide several interpretations of the curve which, taken singly or together, will enable the accurate and reliable determination of a TD to be made. Three methods have been developed herein and determined, by experiment, to provide just such a reliable interpretation of the curve between applied power and HDI DC response signal that enables an accurate determination of a TD to be made. The methods, which will be described in detail below, are denoted:

Method 1: Minimum Slope Method (MinSlp);
Method 2: Slope's Slope method (Slp2J)
Method 3: Linear Fit of the Slope (Fit1RJ).

The HDI's signal (from whatever type sensor being utilized) has both DC (low frequency) and AC (high frequency) components. When the slider flies at a low clearance and even contacts the disk, a strong high frequency (AC component) from the HDI might appear if the TD vibration is strong. In that case, the AC component can be used to detect the TD. However, if the TD vibration is weak, the AC signal might itself be weak and too weak to produce a good detection of the TD. In that case, the DC component might give better TD detection and a more reliable detection. It is the object of the present disclosure to devise a method for using the DC signal of a HDI sensor to obtain a reliable and accurate indication of a TD.

As shown in the scaled graphical illustration of a DC signal of FIG. 2a, when applied DFH power increases, the HDI's DC signal first increases due to a direct DFH power heating effect (see region between 60 and 75 mW of power). This effect is a result of direct heating of the HDI sensor by the DFH heater elements and does not reflect heating due to the aerodynamics of the slider approaching the disk.

As the spacing between the head and the disk decreases due to thermal protrusion of the head with increase of applied DFH heating, the air bearing cooling effect (cooling due to airflow beneath the slider ABS) becomes larger (see region between 75 and 80 mW) and the graphical shape of the DC signal begins to bend over to assume a more horizontal form.

Referring to FIG. 2b, there is shown, for clarity, the results of a different approach to TD, which is chosen because the signature of the produced signal is more pronounced and easier to interpret for the purposes of this discussion. However, both types of curve as well as curves intermediate between them, appear in practice and are analyzed using the present method.

At point A in both FIG. 2a and FIG. 2b, the DFH heating effect on the sensor reaches a state of equilibrium as a result of the simultaneous air bearing cooling and the DC signal becomes flat and horizontal (see region between 80 and 85 mW). Further increase of the DFH power will make the slider contact disk asperities and then the hard contact heating appears at point B (approximately 92 mW in FIG. 2b) from which point the DC signal once again begins to increase, now as a result of the actual contact.

The question is, how best to use the DC signal curve to precisely detect a TD? There are potentially many methods that can be applied. Some would use point A of the signal (point of zero slope) to indicate a TD point. However, this point may be too early in anticipating TD. Others might use point B, where the next rapid increase in DC signal occurs. However, this point may be too late, with the TD having already occurred. However, our empirical study indicates that while the points A and B are accurate for some cases, better and more reliable methods are needed and can be obtained. Our discussion to follow will elaborate of three new methods that can provide the required accuracy for TD detection.

BRIEF DESCRIPTION OF THE DRAWINGS

The objects, features, and advantages of the present disclosure are understood within the context of the Detailed Description as set forth below. The Detailed Description is understood within the context of the accompanying figures, wherein:

FIG. 2a shows clearly the relationship between regularly incremented DFH heater power and the DC response of a HDI sensor as the head approaches the disk. In FIG. 2b, there is shown a signature in which the slope of a region of the graph changes more markedly.

DETAILED DESCRIPTION

The present disclosure teaches a method of detecting a touch down (TD) between a dynamic flying height (DFH) slider-mounted read/write head and a rotating disk surface utilizing the DC component of an head-disk-interference (HDI) sensor signal produced as the slider approaches the disk surface by increasing the power input to the DFH heater.

The following is a brief description of three methods that have been determined to provide just such an interpretation of the curve between applied power and the magnitude of the HDI DC response signal that enables an accurate determination of a TD to be made. It is to be noted that each of the following methods is illustrated and described by reference to a graphical representation of a DC response signal. This graphical representation permits a clear understanding of the methodology being applied, particularly to the role of the slope and the slope of the slope. However, in actual use of these methods, it is understood that the DC signal is obtained from the HDI sensor, stored and processed within the HDD itself in the form of a succession of digital signals corresponding to increments of the heater power. Mathematical operations are performed on these signals by hardware residing within the HDD that can implement these operations. All the separate mathematical operations themselves, including capturing a signal, storing a signal, computing slopes and slopes of slopes from a series of sequential elements of these signals, are implemented in the HDD using known methods. We now describe the three methods to be used to determine the TD point.

Figure 1:
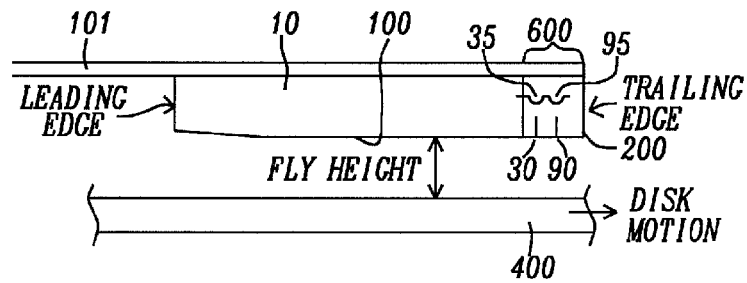
FIG. 1 is a schematic drawing illustrating a DFH-type slider-mounted read/write head positioned over a rotating disk.
Figure 2A:
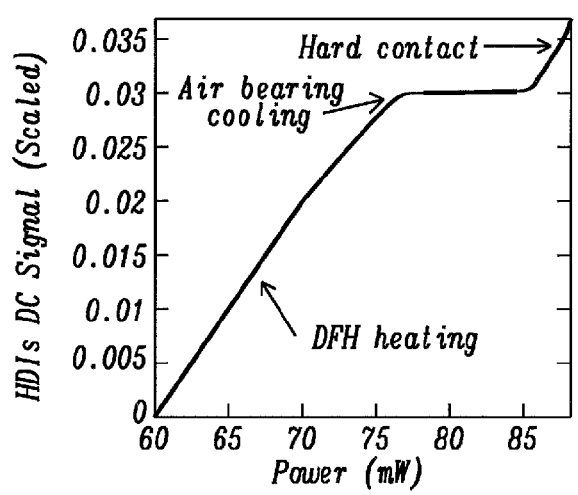
FIG. 2a and FIG. 2b are graphical illustrations of two different exemplary approaches to touchdown, showing different signatures (shapes) of the curves.
Figure 2B:
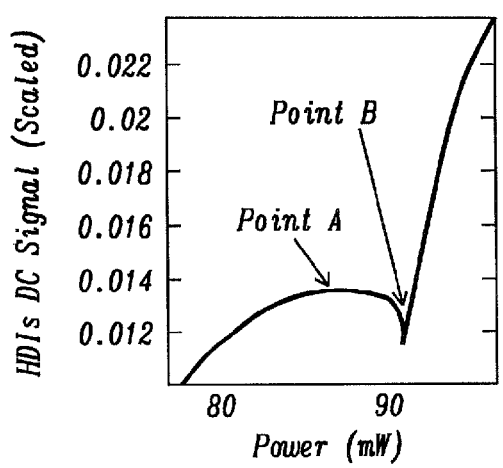

1. Method 1: Minimum Slope Method (MinSlp). The slope of the DC signal of the HDI vs. input power to the DFH heater (see FIG. 2a) is calculated. The slope can be obtained from only two data points in the original DC signal, but use of more than two data points will suppress the effects of noise on the calculation. To further reduce the effects of noise, some form of curve smoothing can be applied to the generation of the graph, such as the creation of a moving average based on the determination of each new data point. Based on a multiplicity of repeated tests, it was determined that a point of minimum slope, such as point C in FIG. 3b, could be used to determine that a TD had occurred.

During a TD detection process using this method, at each DFH power step (see "diamonds" forming the curve in FIG. 3a) the slope of the curve was calculated and was checked to see if a minimum slope had been reached. For example, at a step "k" (k=5, 6, 7, . . . ) of applied power, we define the slope as "slope(k)". If slope(k-4)>slope (k-3)>slope(k-2) and slope (k-2)<slope(k-1)<slope(k), then point C has been found to be at step k-2 and point C is considered to be the TD point.

Figure 3A:
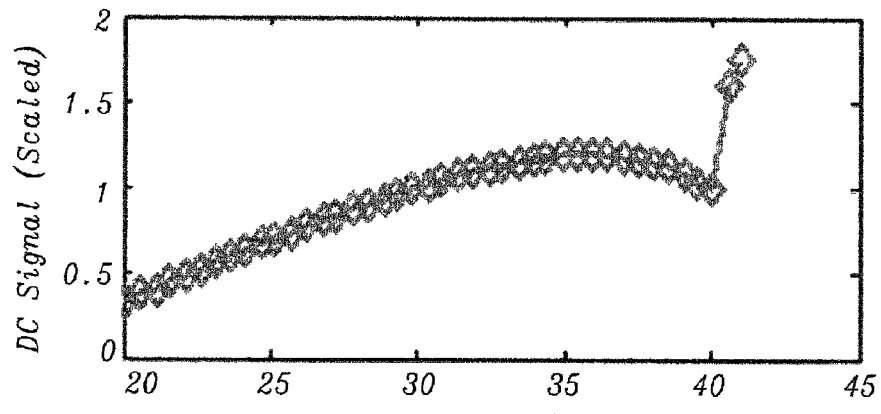
FIGS. 3a, 3b and 3c represent further analysis of the curve of FIG. 2a, showing the DC response of the HDI sensor in FIG. 3a, the slope of the DC signal in 3b and finally the slope's slope in 3c, indicating a point D that can be interpreted as achieving a TD.
Figure 3B:
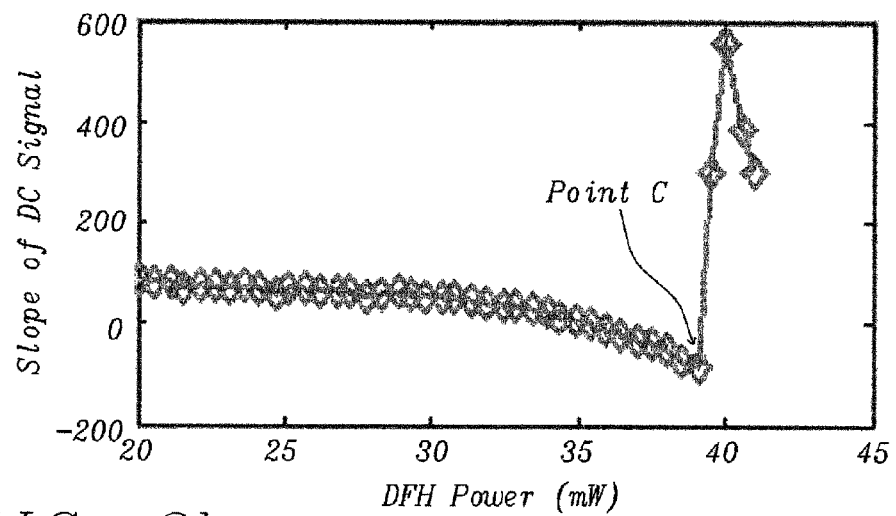
Figure 3C:
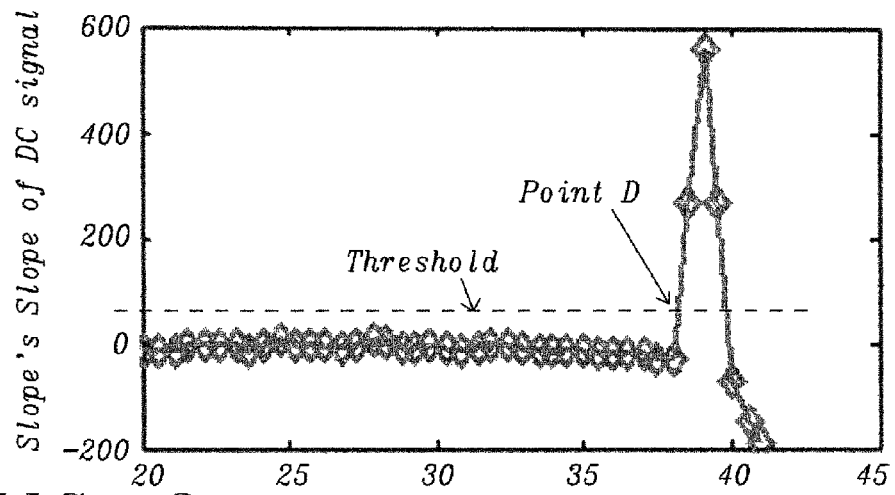

2. Method 2: Slope's Slope method (Slp2J). FIGS. 3a, 3b and 3c represent a DC signal (3a). the slope of that signal (3b) and the slope of the slope (3c) of the signal. Referring to FIG. 3c, the slope of the slope (i.e., change in slope/DFH power or Slp2J) was calculated. The slope of the slope can be obtained with two data points in the slope curve (FIG. 3b), but more than two data points may be used in the calculation to suppress the effects of noise on the calculation of Slp2J. To further reduce the effect of noise, some type of curve smoothing, such as a moving average, might be applied in order to generate the Slp2J curve of FIG. 3c. Typically, we can set a threshold as three times the standard deviation of the slope of slopes calculated by the chosen method. If two successive points exceed the threshold value, then we can consider the TD point to have been reached just prior to the threshold. Referring to FIG. 3c, we see that point D is the point at which the threshold value (horizontal line labeled "Threshold") is first exceeded, so it is the point at which a TD has occurred.

Figure 4A:
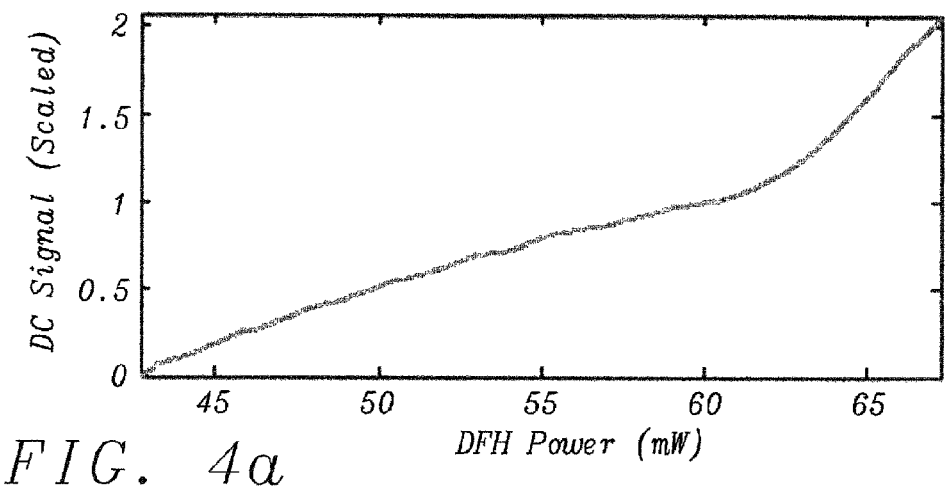
FIGS. 4a, 4b and 4c is an illustration of a method that is appropriate for determining a TD when the DC signal shows no point at which the slope is zero (FIG. 4a). The method used in this case corresponds to a linear fit to the slope (FIG. 4b). A residue is obtained by constructing a band of +/−3 standard deviations (FIG. 4c), and assigning the TD point when 2 successive data points fell outside of the band.
Figure 4B:
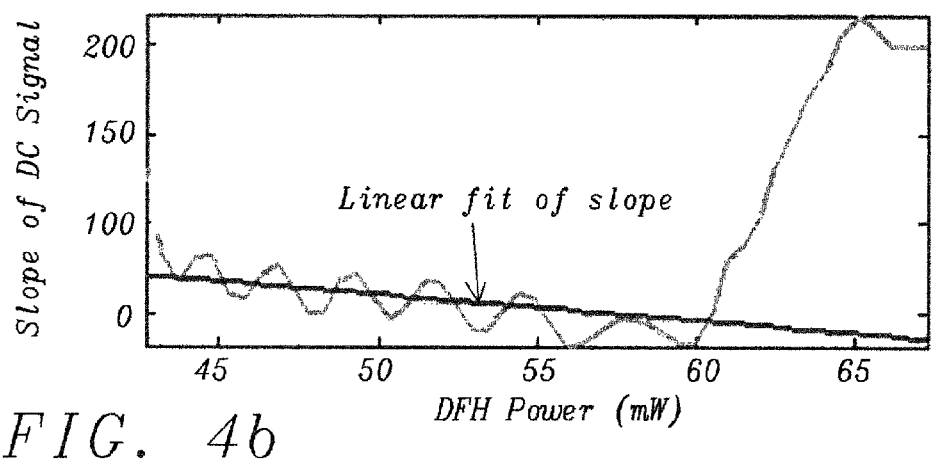
Figure 4C:
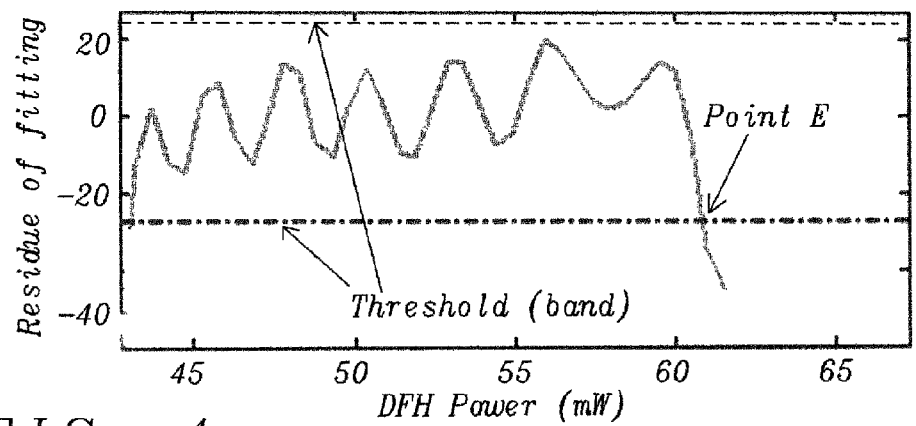

3. Method 3: Linear Fit of the Slope (Fit1RJ). Referring to FIG. 4a we see a case where the trend of the DC signal from the HDI sensor as increasing power is supplied to the heater is quite different from the two previous cases. In FIG. 4a the curve has no obvious point of zero slope and, in fact, the curve of the slope in FIG. 4b shows a very wavy appearance for which a definite value of the slope is difficult to extract. In this case, therefore, many different TD detection methods using the DC mode of the HDI signal might not work well. Therefore, for this set of curves, an alternative method is applied, which can be shown to work well. Specifically, we fit a straight line (linear fit) to the wavy slope (Fit1RJ). After the slope curve of FIG. 4b is determined, a linear curve fit is generated and two lines forming a threshold band about the slope curve are created. The threshold band has a width of +/− three standard deviations of the range of values obtained for creating the linear fit. When the first two successive data points were obtained that fell outside of the band, the TD detection was declared at the first of those points, namely at point E of FIG. 4c. It is to be noted that the TD is a rather catastrophic event in the sense that the occurrence of a true touch down (TD) means that the state of the slider has changed from being "very close," to the disk surface to creating an actual contact. We, therefore, assume that such a catastrophic change of state would correspond to some form of a catastrophic change in the slope signature. This is why we take exceeding the three standard deviations band about the linear fit to act as an indication of just such a catastrophic event.

Figure 5A:
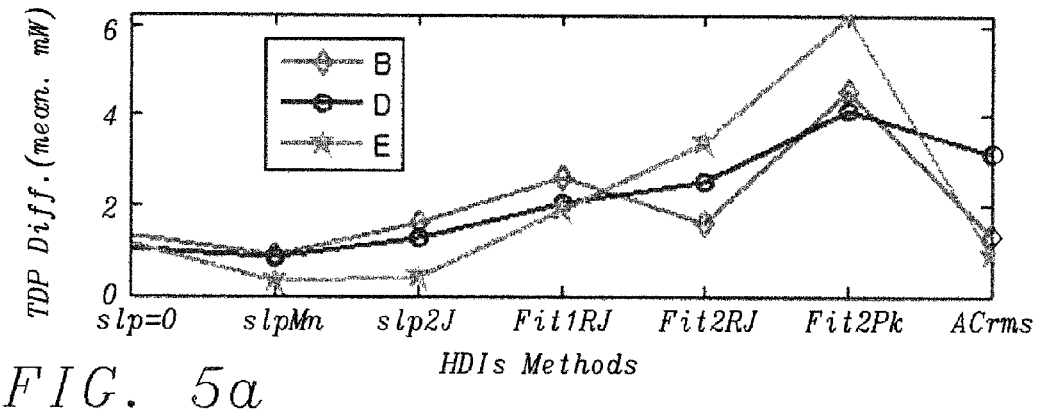
FIGS. 5a, 5b and 5c are comparisons of the TD detection points for the three new detection methods of the present disclosure and four other methods, all applied to three different HDDs in FIG. 5a, to two different HDDs in 5b and to four different HDDs in 5c.
Figure 5B:
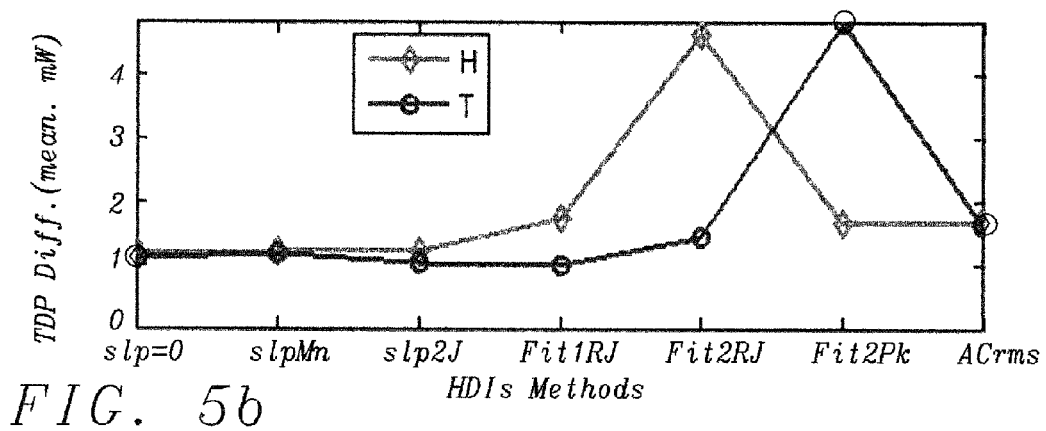
Figure 5C:
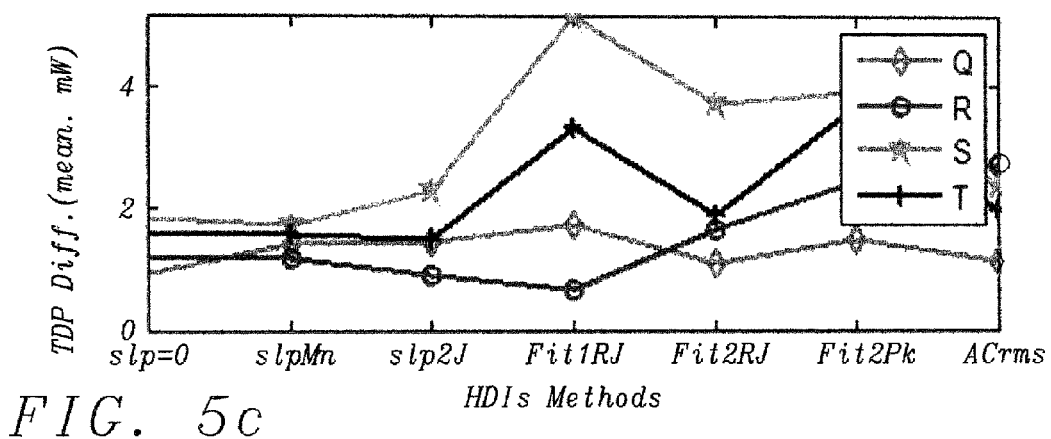

The three new methods described above, as well as other methods deemed to provide certain standards of accuracy, have been applied under many conditions that included different HDDs and different HDI sensors. Referring to FIGS. 5a, 5b and 5c, there is shown the results of a total of nine different exemplary cases, denoted for brevity B, D & E (FIG. 5a); H &T (FIG. 5b) and Q, R, S &T (FIG. 5c). These cases illustrate the results of using the three methods of the present disclosure as well as four other methods that are known in the prior art. To make comparisons between all the various methods, a Laser Doppler Vibrometer (LDV) was used to actually measure vibrations of the gimbals and to produce what can arguably be called the most accurate method of determining that a TD had occurred. The vertical axes in each figure indicate differences in the determination of the TD point so they show the degree with which a given method is accurate for a given exemplar. The horizontal axes indicate the seven different methods that were applied to each set of HDDs and HDIs. Note that the three methods disclosed herein are denoted Slp1Mn, Slp2J and Fit1RJ along the horizontal axes.

An important result is that although one method or another may have proved best in some specific case, the three methods discussed herein: Slp1Mn (or MinSlp), Slp2J and Fit1RJ, taken together, provided overall results that equaled or bettered all the other methods. For example, Slp1Mn (the minimum slope method MinSlp) and ACrms (a method using the AC signal of an HDI sensor) are best for case B in FIG. 5a. We would therefore suggest that these two methods be implemented in the drive. In case E of FIG. 5a, however, Slp1Mn, Slp2J and ACrms are the best. For case T of FIG. 5c, the three proposed methods Slp1Mn, Slp2J and Fit1RJ are the best. If all three methods are implemented in the drive and their results are combined, a more accurate and reliable TD detection can be obtained. We would, therefore, suggest that implementations of all three methods be implemented within system hardware so that the HDD is equipped to apply each method when TD determination is desired.

We note also that the present methods are applicable, accurate and reliable to TD determinations while the HDD is being manufactured or is in use in the field. We note further that the present methods are applicable, accurate and reliable as the DFH head is flown across the surface of the disk from an outside radius to an inside radius.

As is understood by a person skilled in the art, the preferred embodiments of the present disclosure are illustrative of the present disclosure rather than being limiting of the present disclosure. Revisions and modifications may be made to methods, processes, materials, structures, and dimensions through which touch downs (TDs) between a DFH-type read/write head and a hard disk surface can be measured using the DC signal component of a HDI sensor, while still providing such methods, processes, materials, structures and dimensions in accord with the present disclosure as defined by the appended claims.

What is claimed is:

1. A method for determining touch downs (TDs) of a dynamic flying height (DFH) controlled read/write head against the surface of a rotating disk in a HDD or spin stand comprising:
   providing a hard disk drive (HDD) or spin stand having a rotatable disk mounted therein;
   providing the DFH controlled read/write head having at least one heater element and at least one head-disk interference (HDI) sensor capable of generating a DC signal mounted therein, wherein said read/write head is flyable above said rotating disk; then, while rotating said disk, flying said read/write head over said disk; and
   supplying power to said at least one heater element in a stepwise incremented manner whereby said DFH controlled head approaches a surface of said disk; and
   analyzing a DC component of a signal generated by said HDI sensor as said power to said DFH head is incremented and whereby said DFH head approaches said surface of said disk;
   wherein said DC component is generated as a functional relationship between said DC component and said power supplied to said heater element; then
   processing said relationship to determine a power level step at which a touch down has occurred.

2. The method of claim 1 wherein said relationship between said power supplied to said heater element and said HDI sensor signal's DC component at that power has a slope and wherein said slope has a point of minimum slope, at whose power level the touch down occurs.

3. The method of claim 2 wherein said point of minimum slope is calculated by a method comprising:
   generate a succession of heater power levels, PWR(k) corresponding to an integer index k;
   record and store a corresponding succession of HDI sensor signal DC components for each value of k in a form DC(k), wherein DC(k) is the magnitude of said DC component at index value k;
   calculate a slope, slope(k), of DC(k) for each value of the incrementing index k and maintain a decremented set of values of said slope(k) for a range of lesser k values, k-4, k-3, k-2, k-1, for each of said values of k;
   find a minimum value of slope(k) within each range of k values until said slope(k) increases for a next value of k; whereby
   the previous value of k for said minimum corresponds to power level at which a touch down occurs.

4. The method of claim 1 wherein said graphically representable relationship has a slope and wherein a curve of said slope itself has a slope and wherein said slope's slope is used to determine a power level at which a touch down occurs.

5. The method of claim 4 wherein said slope's slope is denoted Slp2 and is calculated by a method comprising:
   generate a succession of heater power levels, PWR(k) corresponding to an integer index k;
   record and store a corresponding succession of HDI sensor signal DC components for each value of k in a form DC(k), wherein DC(k) is the magnitude of said DC component at index value k;
   calculate a slope, slope(k), of DC(k) for each value of the incrementing index k, using as a first approximation two neighboring values of k to compute a difference of DC(k); then
   smooth curve slope(k), using a moving average of successive values of DC(k); then
   calculate a slope, Slp2(k), of slope(k).

6. The method of claim 5, further comprising:
   compute a standard deviation of values of Slp2(k) and define a threshold of three times said moving average; when two successive values of Slp2(k) exceed the threshold value, the first value of k of said two successive values defines the heater power at which the touch down occurs.

7. The method of claim 1 wherein a calculated slope, slope (k), of said functional relationship between said DC heater power Pwr(k) and said corresponding DC component of said HDI sensor response, DC(k), does not exhibit a consistent point maintaining a zero slope and wherein said calculated slope, slope(k), has a wavy configuration that does not converge to a constant slope; then
   generate a linear approximation Fit1(k) of said wavy configuration of slope(k); then;
   create a band of width +/− three standard deviations of the data points used to construct said Fit1(k) and the value of k wherein points k and k+1 exceed said band is the value of Pwr(k) where the TD occurs.

8. The method of claim 1 where a combination of analyses of the DC signal vs. heater power curve is used to provide a best determination of a touch down point for an arbitrary HDD configuration and HDI sensor type.

9. The method of claim 1 wherein said functional relationship is stored in said HDD.

10. The method of claim 9 wherein said stored functional relationship is processed in said HDD to create a slope and a slope of a slope.

11. The method of claim 10 wherein said slope of a slope is approximated by a straight line fit provided by an appropriate algorithm stored in and implemented by said HDD.

12. The method of claim 11 wherein thresholds are created by said HDD to determine points at which said slope or said slope of a slope exceed a threshold and, thereby, signal a TD.

13. A hard disk drive (HDD) or spin stand including a dynamic flying height (DFH) read/write head capable of evaluating a touch down condition comprising:
   a HDD or spin stand having at least one rotatable disk therein;
   a DFH controlled read/write head associated with said at least one rotatable disk, wherein said read/write head is flyable above said rotating disk; and
   a head-disk interference (HDI) sensor for generating a DC signal component corresponding to a reduction in fly height of said read/write head;
   a variable and controllable stepwise power input for applying variable and controllable stepwise power to said read/write head as a function of an incrementable index, wherein a power step produces a corresponding change in flying height of said read/write head and wherein a range of power steps produces a corresponding range of flying heights up to and including a step that produces a touch down;
   a processor and a storage medium for storing a processed form of said DC signal component in the form of a function of said incrementable index, a slope of said function and a slope of a slope of said function; wherein at least one analysis of a slope of said processed form of said DC component of a signal generated by said HDI sensor indicates the occurrence of said touch down.

14. The HDD of claim 13 wherein said function has a point of minimum slope and wherein said point corresponds to a power level at which a touch down occurs.

15. The HDD of claim 13 wherein said functional relationship has a slope and wherein said slope has a slope and wherein the slope's slope provides a determination of a power level at which a touch down occurs.

16. The HDD of claim 13 wherein a slope of said functional relationship does not converge to a consistent value but wherein a linearized representation of said slope has a value and wherein said linearized representation provides a determination of a power level at which a touch down occurs.

17. The HDD of claim 13 wherein a combination of methods including determination of a point of minimum slope and a determination of a slope's slope and the determination of a linearized slope provide a power level at which a touch down occurs.

* * * * *